(12) United States Patent
Corley

(10) Patent No.: US 11,312,477 B2
(45) Date of Patent: Apr. 26, 2022

(54) AIRCRAFT PROPELLER ELECTRIC BLADE PITCH CHANGE AND CONTROL

(71) Applicant: Hamilton Sundstrand Corporation, Charlotte, NC (US)

(72) Inventor: Thomas G. Corley, Suffield, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 181 days.

(21) Appl. No.: 16/522,869

(22) Filed: Jul. 26, 2019

(65) Prior Publication Data

US 2021/0024199 A1 Jan. 28, 2021

(51) Int. Cl.
*B64C 11/44* (2006.01)
*B64C 11/30* (2006.01)

(52) U.S. Cl.
CPC ............ *B64C 11/44* (2013.01); *B64C 11/301* (2013.01)

(58) Field of Classification Search
CPC ........ B64C 11/30; B64C 11/44; B64C 11/301
See application file for complete search history.

(56) References Cited

U.S. PATENT DOCUMENTS

| | | | | |
|---|---|---|---|---|
| 1,973,355 A | * | 9/1934 | O'Bryan | B64C 11/44 416/155 |
| 2,761,518 A | | 9/1956 | Treseder et al. | |
| 3,996,816 A | * | 12/1976 | Brighton | F16H 49/001 74/640 |
| 4,591,313 A | | 5/1986 | Miyatake et al. | |
| 5,263,846 A | | 11/1993 | Smith | |
| 8,561,937 B2 | | 10/2013 | Goodarzi | |
| 9,889,925 B2 | * | 2/2018 | Rawdon | B64C 11/06 |
| 10,710,741 B2 | * | 7/2020 | Miki | G01P 5/00 |
| 2016/0083077 A1 | | 3/2016 | Rawdon | |

FOREIGN PATENT DOCUMENTS

| | | |
|---|---|---|
| EP | 1961919 A2 | 8/2008 |
| FR | 819581 A | 10/1937 |
| WO | 2005084373 A2 | 9/2005 |

OTHER PUBLICATIONS

European Search Report for European Application No. 19216126.3; dated Aug. 10, 2020; 10 pages.

* cited by examiner

*Primary Examiner* — Richard A Edgar
(74) *Attorney, Agent, or Firm* — Cantor Colburn LLP

(57) ABSTRACT

A propeller assembly of an aircraft includes a hub, a plurality of propeller blades extending from the hub and secured thereto and a propeller blade pitch change system located at at least one propeller blade of the plurality of propeller blades. The propeller blade pitch change system includes a pitch change actuator located in the propeller blade, and a drive mechanism operably connected to the pitch change actuator and to the propeller blade to urge rotation of the propeller blade about a propeller blade axis.

13 Claims, 3 Drawing Sheets

AIRCRAFT PROPELLER ELECTRIC BLADE PITCH CHANGE AND CONTROL

BACKGROUND

Exemplary embodiments pertain to the art of propeller systems. More particularly, the present disclosure relates to blade pitch control systems of aircraft propeller systems.

Propeller systems of aircraft typically utilize some form of mechanism to change the pitch of propeller blades arranged about a hub, to stabilize or improve performance and/or efficiency of propeller operation. Such systems are typically hydraulically-powered, requiring high pressure oil flow and associate valves and seals. The oil pressure is utilized to actuate pitch change mechanisms to change the pitch of the propeller blades.

Some pitch change mechanisms are electrically powered, utilizing a large, heavy, centrally located motor driving central pitch change mechanisms to collectively change the pitch of the propeller blades.

BRIEF DESCRIPTION

In one embodiment, a propeller assembly of an aircraft includes a hub, a plurality of propeller blades extending from the hub and secured thereto and a propeller blade pitch change system located at at least one propeller blade of the plurality of propeller blades. The propeller blade pitch change system includes a pitch change actuator located in the propeller blade, and a drive mechanism operably connected to the pitch change actuator and to the propeller blade to urge rotation of the propeller blade about a propeller blade axis.

Additionally or alternatively, in this or other embodiments the pitch change actuator is located in a blade pocket of the propeller blade.

Additionally or alternatively, in this or other embodiments the pitch change actuator is connected to the hub via one or more anti-rotation features.

Additionally or alternatively, in this or other embodiments the pitch change actuator is one of a closed loop servomotor or a stepper motor.

Additionally or alternatively, in this or other embodiments the drive mechanism is one of a harmonic gear train or a planetary gear train.

Additionally or alternatively, in this or other embodiments one or more blade pitch sensors detect a pitch angle of the propeller blade.

Additionally or alternatively, in this or other embodiments the one or more blade pitch sensors are operably connected to a pitch change controller to provide feedback of propeller blade pitch to the pitch change controller.

Additionally or alternatively, in this or other embodiments a power supply is configured to provide electrical power to the pitch change actuator via the hub.

In another embodiment, a propeller blade pitch change system includes a pitch change actuator positioned in a blade pocket of a propeller blade and a drive mechanism operably connected to the pitch change actuator and to the propeller blade to urge rotation of the propeller blade about a propeller blade axis.

Additionally or alternatively, in this or other embodiments the pitch change actuator is configured for connection to a propeller hub via one or more anti-rotation features.

Additionally or alternatively, in this or other embodiments the pitch change actuator is one of a closed loop servomotor or a stepper motor.

Additionally or alternatively, in this or other embodiments the drive mechanism is one of a harmonic gear train or a planetary gear train.

Additionally or alternatively, in this or other embodiments one or more blade pitch sensors detect a pitch angle of the propeller blade.

Additionally or alternatively, in this or other embodiments the one or more blade pitch sensors are operably connected to a pitch change controller to provide feedback of propeller blade pitch to the pitch change controller.

In yet another embodiment, a method of pitch change of a propeller blade of a propeller includes activating a pitch change actuator, the pitch change actuator located in a propeller blade pocket of the propeller blade. A drive mechanism operably connected to the pitch change actuator is driven via activation of the pitch change actuator, and a pitch of the propeller blade is changed via driving of the drive mechanism, the drive mechanism operably connected to the propeller blade.

Additionally or alternatively, in this or other embodiments the pitch change actuator is one of a servomotor or a stepper motor.

Additionally or alternatively, in this or other embodiments the drive mechanism is one of a harmonic gear train or a planetary gear train.

Additionally or alternatively, in this or other embodiments the pitch of the propeller blade is detected via one or more blade pitch sensors.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
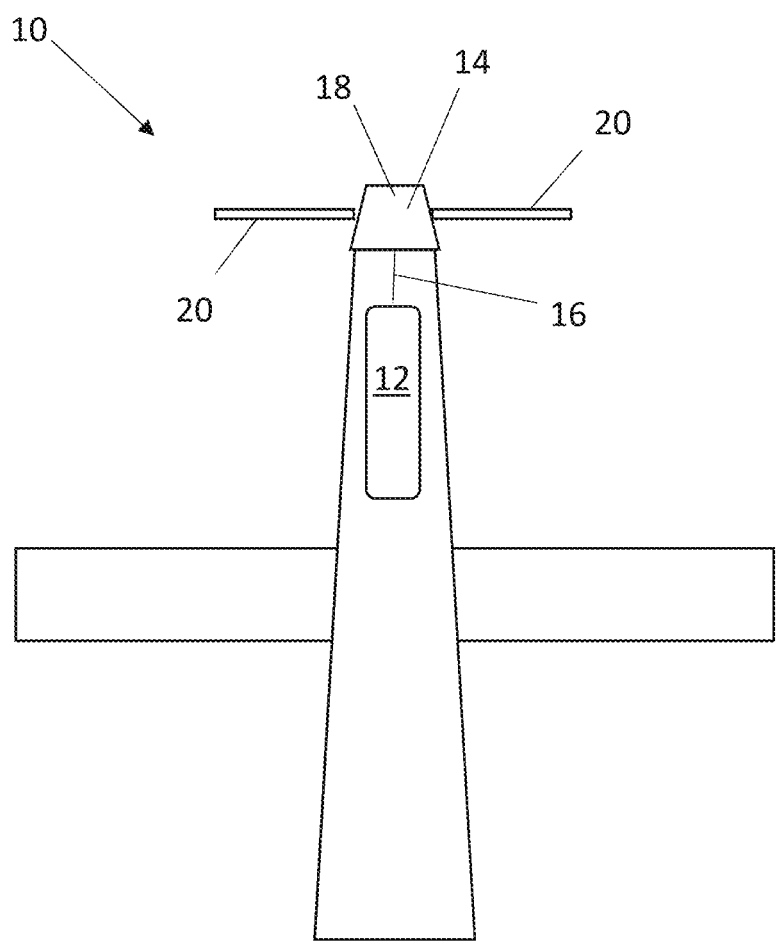
FIG. 1 is a plan view of an embodiment of an aircraft.

Referring to FIG. 1, illustrated is an embodiment of an aircraft 10. The aircraft includes a power system 12, which drives rotation of a propeller 14 about a propeller axis 16. The power system 12 is operably connected to the propeller 14 by, for example, a propeller shaft 16. While one propeller 14 and one power system 12 is shown in the embodiment of FIG. 1, one skilled in the art will readily appreciate that the present disclosure may be similarly applied to aircraft 10 having two or more propellers 14 and/or two or more power systems 12. In some embodiments, the power system 12 includes an internal combustion engine or a gas turbine engine. In some embodiments, the power system 12 is a hybrid power system 12 including electrical power to drive the propeller, at least in some operating conditions.

Figure 2:
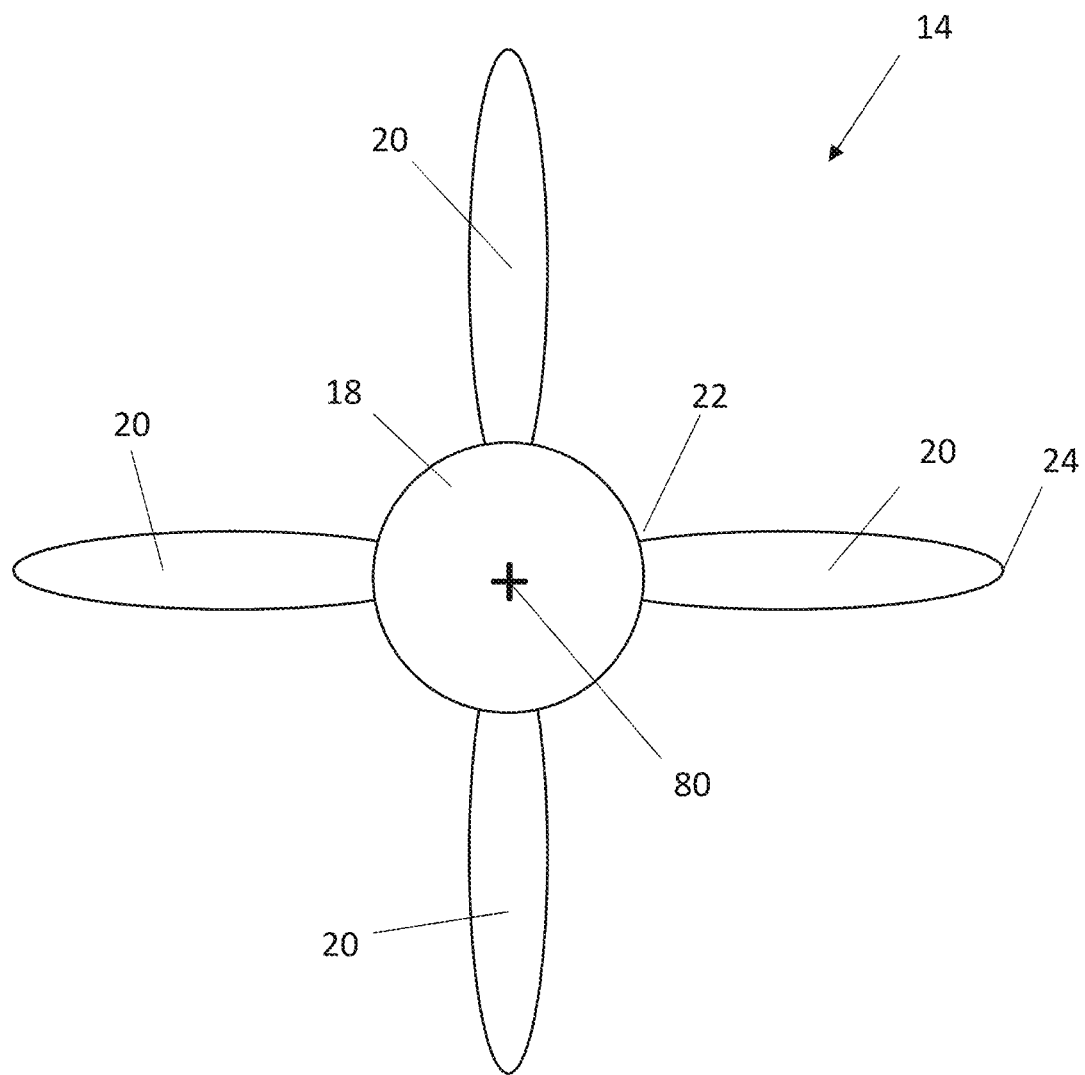
FIG. 2 is a plan view of an embodiment of a propeller assembly.

Referring to FIG. 2, shown is an embodiment of a propeller 14. The propeller 14 includes a hub 18 located at a propeller axis 80, and a plurality of propeller blades 20 extending radially outwardly from the hub 18. While four propeller blades 20 are illustrated in the embodiment of FIG. 2, other embodiments of propellers 14 may include two, three, five or more propeller blades 20. Each propeller blade 20 extends from a blade root 22 to a blade tip 24.

Figure 3:
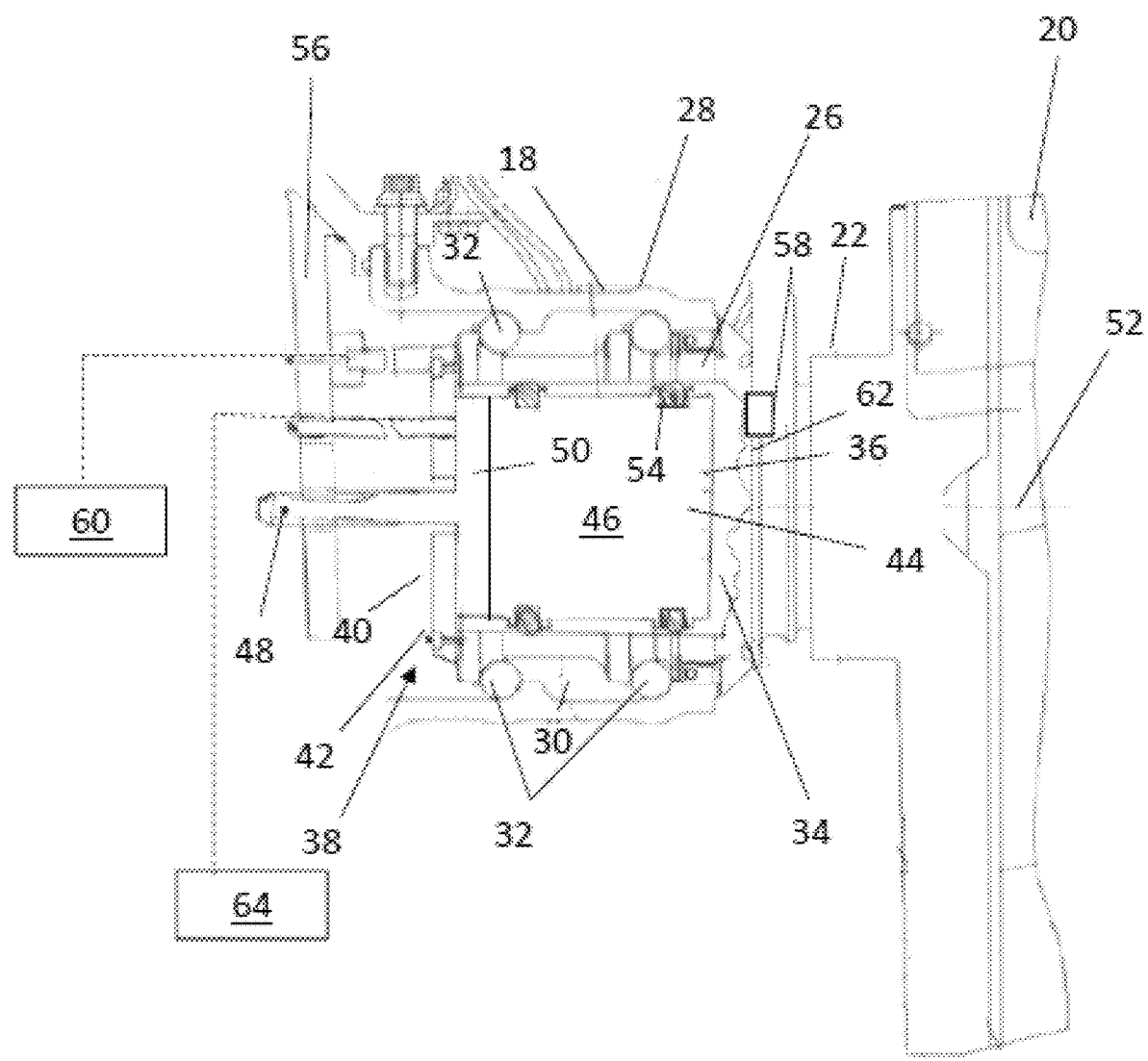
FIG. 3 is a cross-sectional view of an embodiment of a propeller blade pitch system.

Referring now to FIG. 3, the propeller blade 20 includes a blade retention portion 26 located at or near the blade root 22. The blade retention portion 26 is received at a hub retention portion 28 of the hub 18. A blade retention apparatus 30, including one or more retention bearings 32 is utilized to retain the propeller blade 20 at the hub 18.

The propeller blade 20 is formed with a blade pocket 34 extending from the blade root 22 at least partially to the blade tip 24. A pitch change actuator 36 is disposed in the blade pocket 34. The pitch change actuator 36 is operably connected to the propeller blade 20 via an attachment mechanism 38, such as a plate 40 and one or more fasteners 42, thus retaining the pitch change actuator 36 in the blade pocket 34. The pitch change actuator 36 includes an actuator housing 44 in which a motor 46, such as a high torque servomotor or a stepper motor is located. Further, the motor 46 is connected to a drive shaft 48 via a drive train 50, such as a harmonic gear train or a compact planetary gear train. The drive train 50 provides speed reduction and torque increase of motor 46 output to the drive shaft 48. The drive train 50 is operably connected to the propeller blade 20 at, for example, the blade root 22, such that operation of the pitch change actuator 36 rotates the propeller blade 20 about a propeller blade axis 52, thus changing a pitch of the propeller blade 20. In some embodiments, the pitch change actuator 36 may be located in the blade pocket 34 along with one or more vibration isolation and/or environmental seals 54 to support the pitch change actuator 36 in the blade pocket 34.

The pitch change actuator 36 is configured to provide a pitch change rate of the propeller blade 20 between 20 and 30 degrees per second. Further, when the drive train 50 is not driving pitch change of the propeller blade 20, the drive train 50 acts as a brake to prevent pitch change of the propeller blade 20.

In this depiction, the pitch change actuator 36 connected to the dome structure's anti-rotation feature 56 that is structurally grounded to the hub 18. A similar structural grounding embodiment could be accomplished by a feature integral to and extending from the center of the hub 18. The anti-rotation features 56 ensures torque of the pitch change actuator 36 is transmitted to the propeller blade 20 via the drive train 50. One or more blade angle sensors 60 are located, for example, between the hub 18 and the propeller blade 20. A similar embodiment could be accomplished by locating them depicted by 58. The blade angle sensors 58 or 60 are configured to detect a pitch angle of the propeller blade 20 to provide feedback to the pitch change actuator 36 and/or a pitch change controller (not shown) that could be propeller mounted on the dome (rotates with the propeller), or on the stationary engine side of the propulsion system. The pitch change controller is connected to the pitch change actuator 36, which powers and controls operation of the pitch change actuators 36. In some embodiments, the blade angle sensors 58 are secured at a hub face 62 between the hub 18 and the propeller blade 20.

This embodiment shows the pitch change actuator attached to blade (rotates with the blade pitch) and actuating against a structural anti-rotation grounding to the hub. Another embodiment could attach the pitch change actuator to a structural grounding of the hub and actuate to a structural feature of the blade (the pitch change actuator/motor would not rotate on the blade centerline).

In some embodiments, electrical power is provided to the pitch change actuator 36 and the blade angle sensors 58 or 60 from an aircraft power source 64 through the hub 18 via, for example, a slip ring or other system (not shown). In other embodiments, the pitch change actuator 36 is battery-powered and may further be connected to the pitch change controller and/or the blade angle sensors 58 or 60 via a wireless connection.

The pitch change actuator 36 is configured to allow for pitch change speeds of approximately 25 degrees per second. Further the pitch change actuator 36 provides output torques, depending on the propeller application, that may be as high as 15,000 in-lbs. Harmonic drives trains 50 can have very high reduction ratios of about 200 to 1, while planetary drive trains 50 provide reduction ratios of about 15 to 1. To obtain a 25 degree per second pitch change rate, that is approximately 840 rpm. So, "high speed" closed loop stepper or servo motor would be in the range of 12,000 to 50,000 rpm range. However, this will be a function of torque output capability of the basic motor before packaging or sizing of the reduction gearing.

Incorporating pitch change mechanisms such as described herein in the propeller blades 20 of the propeller 14 allows for compact and individual control of the pitch angle of each propeller blade 20. Individual control of the pitch angles of the propeller blades 20 may be utilized to correct an aerodynamic imbalance of the propeller 14, and to provide cyclic pitch control of the propeller.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:
1. A propeller assembly of an aircraft, comprising:
a hub;
a plurality of propeller blades extending from the hub and secured thereto;
a propeller blade pitch change system disposed at at least one propeller blade of the plurality of propeller blades, the propeller blade pitch change system including:

a pitch change actuator disposed in the propeller blade;
a drive mechanism operably connected to the pitch change actuator and to the propeller blade to urge rotation of the propeller blade about a propeller blade axis; and
a shaft operably connected to and driven by the drive mechanism, the shaft connected to the hub via an anti-rotation feature;
wherein the drive mechanism is a planetary gear train.

2. The propeller assembly of claim 1, wherein the pitch change actuator is disposed in a blade pocket of the propeller blade.

3. The propeller assembly of claim 1, wherein the pitch change actuator is one of a closed loop servomotor or a stepper motor.

4. The propeller assembly of claim 1, further comprising one or more blade pitch sensors to detect a pitch angle of the propeller blade.

5. The propeller assembly of claim 4, wherein the one or more blade pitch sensors are operably connected to a pitch change controller to provide feedback of propeller blade pitch to the pitch change controller.

6. The propeller assembly of claim 1, further comprising a power supply configured to provide electrical power to the pitch change actuator via the hub.

7. A propeller blade pitch change system, comprising:
a pitch change actuator positioned in a blade pocket of a propeller blade;
a drive mechanism operably connected to the pitch change actuator and to the propeller blade to urge rotation of the propeller blade about a propeller blade axis; and
a shaft operably connected to and driven by the drive mechanism, the shaft connected to an anti-rotation feature of a hub of a propeller system;
wherein the drive mechanism is a planetary gear train.

8. The propeller blade pitch change system of claim 7, wherein the pitch change actuator is one of a closed loop servomotor or a stepper motor.

9. The propeller blade pitch change system of claim 7, further comprising one or more blade pitch sensors to detect a pitch angle of the propeller blade.

10. The propeller blade pitch change system of claim 9, wherein the one or more blade pitch sensors are operably connected to a pitch change controller to provide feedback of propeller blade pitch to the pitch change controller.

11. A method of pitch change of a propeller blade of a propeller, comprising:
activating a pitch change actuator, the pitch change actuator disposed in a propeller blade pocket of the propeller blade;
driving a drive mechanism operably connected to the pitch change actuator via activation of the pitch change actuator; and
changing a pitch of the propeller blade via driving of the drive mechanism, the drive mechanism operably connected to the propeller blade; and
driving a shaft via the drive mechanism, the shaft secured to an anti-rotation feature of a hub of a propeller assembly;
wherein the drive mechanism is a planetary gear train.

12. The method of claim 11, wherein the pitch change actuator is one of a servomotor or a stepper motor.

13. The method of claim 11, further comprising detecting the pitch of the propeller blade via one or more blade pitch sensors.

* * * * *